US007591022B2

(12) United States Patent
Carpentier et al.

(10) Patent No.: US 7,591,022 B2
(45) Date of Patent: *Sep. 15, 2009

(54) CONTENT ADDRESSABLE INFORMATION ENCAPSULATION, REPRESENTATION, AND TRANSFER

(75) Inventors: Paul R. Carpentier, Boechout (BE); Jan F. Van Riel, Geel (BE); Tom Teugels, Schoten (BE)

(73) Assignee: EMC Corporation, Hopkinton, MA (US)

( * ) Notice: Subject to any disclaimer, the term of this patent is extended or adjusted under 35 U.S.C. 154(b) by 108 days.

This patent is subject to a terminal disclaimer.

(21) Appl. No.: 11/151,619

(22) Filed: Jun. 13, 2005

(65) Prior Publication Data
US 2005/0234996 A1 Oct. 20, 2005

Related U.S. Application Data

(63) Continuation of application No. 11/105,951, filed on Apr. 14, 2005, now abandoned, which is a continuation
(Continued)

(60) Provisional application No. 60/072,316, filed on Jan. 23, 1998.

(51) Int. Cl.
G06F 7/00 (2006.01)
(52) U.S. Cl. .......................... 726/30; 713/165; 711/106; 711/216; 705/51
(58) Field of Classification Search .................. 705/51, 705/2; 713/165, 190; 369/30.01, 30.03, 369/30.04, 27.01, 47.1; 711/108, 216; 726/30
See application file for complete search history.

(56) References Cited

U.S. PATENT DOCUMENTS 5,202,982 A * 4/1993 Gramlich et al. ............... 707/2
(Continued)

FOREIGN PATENT DOCUMENTS

GB 2294132 A 4/1996
(Continued)

OTHER PUBLICATIONS

Moore et al., "Why LIFNs?", Aug. 31, 1995, www.netlib.org.
(Continued)

*Primary Examiner*—Matthew B Smithers
*Assistant Examiner*—Paul Callahan
(74) *Attorney, Agent, or Firm*—Krishnendu Gupta; Penelope S. Wilson (57) ABSTRACT

Representing a number of assets on an originating computer begins with selecting the assets to be represented. Cryptographic hash asset identifiers are generated; each of the asset identifiers is computed using the contents of a particular asset. The asset identifier is a content-based or content-addressable asset name for the asset and is location independent. An asset list is generated that includes the asset identifiers computed from the assets. A cryptographic hash asset list identifier is generated that is computed from the asset list. The asset list identifier is stored for later retrieval. The assets selected are also stored for safekeeping either locally or on a computer network. In the event of loss of the files from the originating computer, the asset list identifier is retrieved. Using the asset list identifier, the original asset list is found and retrieved from its safe location. The asset identifiers from the retrieved asset list are used to find and retrieve the individual assets from their backup locations. The assets are verified by recomputing the cryptographic hash asset identifier for each asset retrieved and comparing it to the asset identifier from the asset list. The MD5 algorithm is used for the cryptographic hash function. Assets are retrieved using a multicast protocol. A series of importer programs searches for assets to retrieve in progressively more remote locations. Assets are retrieved whole or in segments.

69 Claims, 7 Drawing Sheets-

Related U.S. Application Data (63) of application No. 10/893,839, filed on Jul. 19, 2004, and a continuation of application No. 10/894,284, filed on Jul. 19, 2004, now Pat. No. 7,475,432, and a continuation of application No. 10/894,330, filed on Jul. 19, 2004, now Pat. No. 7,398,391, and a continuation of application No. 10/894,450, filed on Jul. 19, 2004, now Pat. No. 7,415,731, said application No. 10/893,839 is a continuation of application No. 09/236,366, filed on Jan. 21, 1999, now Pat. No. 6,807,632, said application No. 10/894,284 is a continuation of application No. 09/236,366, filed on Jan. 21, 1999, now Pat. No. 6,807,632, said application No. 10/894,330 is a continuation of application No. 09/236,366, filed on Jan. 21, 1999, now Pat. No. 6,807,632, said application No. 10/894,450 is a continuation of application No. 09/236,366, filed on Jan. 21, 1999, now Pat. No. 6,807,632.

U.S. PATENT DOCUMENTS

| | | | |
|---|---|---|---|
| 5,404,508 | A | 4/1995 | Konrad et al. |
| 5,491,817 | A * | 2/1996 | Gopal et al. ............... 707/200 |
| 5,581,764 | A | 12/1996 | Fitzgerald et al. |
| 5,600,834 | A | 2/1997 | Howard |
| 5,649,196 | A | 7/1997 | Woodhill et al. |
| 5,694,596 | A | 12/1997 | Campbell |
| 5,701,316 | A | 12/1997 | Alferness et al. |
| 5,710,922 | A | 1/1998 | Alley et al. |
| 5,742,807 | A | 4/1998 | Masinter |
| 5,757,915 | A | 5/1998 | Aucsmith et al. |
| 5,907,619 | A | 5/1999 | Davis |
| 5,991,414 | A | 11/1999 | Garay et al. |

FOREIGN PATENT DOCUMENTS

| | | |
|---|---|---|
| WO | 96/32685 | 10/1996 |
| WO | 97/43717 | 11/1997 |
| WO | 99/38093 | 7/1999 |

OTHER PUBLICATIONS

Prusker et al., "The Siphon: Managing Distant Replicated Repositories" Nov. 8-9, 1990, Proceedings on the Management of Replicated Data IEEE.

Fowler et al., "A User-Level Replicated File System", Jun. 21-25, 1993, Usenix Summer 1993 Technical Conference, Conference Proceedings.

Greene et al., "Multi-Index Hashing for Information Retrieval", Nov. 20-22, 1994, Proceedings, 35$^{th}$ Annual Symposium on Foundations of Computer Science, IEEE.

Bosselaers et al., "The RIPEMD-160 Cryptographic Hash Function", Jan. 1997, Dr. Dobb's Journal.

Kenneth Rich and Scott Leadley, "Hobgoblin: A File and Directory Auditor", Sep. 30-Oct. 3, 1991, Lisa V., San Diego, CA.

Hirano et al., "Improved Extendible Hashing with High Concurrency", 1995, Systems and Computers in Japan, vol. 26, No. 13.

Andrew Gore, "File Wave Agents Cross Atlantic", Mar. 29, 1993, MACWEEK.

Robert Hess, "FileRunner Gets in Sync with Mac", May 3, 1993, MACWEEK.

Schneier, Bruce, Applied Cryptograph 2$^{nd}$ Edition. John Wiley and Sons Pub., Oct. 1995, pp. 30-31.

* cited by examiner

FIG. 1

Descriptor File 200

```
202  204                 206
<folder name = "XXXXX" timestamp = "1969.12.31 03:59:59">
212  214                 216
  <folder name = "XXXXX" timestamp ="1997.11.21 11:57:06">
222  224                 226                                228              230
    <file name = "AAAAA.AAA" timestamp ="1997.11.24 02:39:28" size = "139" md5="5PI5TTAMKVVJGx5Q34QGFBLOOVD"/>
232  234                 236                                238              240
    <file name = "BBBBB.BBB" timestamp ="1997.11.24 02:36:26" size = "143" md5="DL2N74C6RNUJMx61LM9S7OT7MCT"/ft>

<file name = "antenna.bat" timestamp ="1997.11.05 10:38:10" size = "252" md5="04MF5QS17GLH7xAUGQMOMOG3KBU"/>
219
  <end folder>
208
<end folder>
```

CONTENT ADDRESSABLE INFORMATION ENCAPSULATION, REPRESENTATION, AND TRANSFER

This application is a continuation of prior application Ser. No. 11/105,951, filed Apr. 14, 2005, entitled CONTENT ADDRESSABLE INFORMATION ENCAPSULATION, REPRESENTATION AND TRANSFER, which is a continuation of prior application Ser. Nos. 10/893,839, 10/894,284, now U.S. Pat. No. 7,474,432, Ser. No. 10/894,330, now U.S. Pat. No. 7,398,391, and Ser. No. 10/894,450, now U.S. Pat. No. 7,415,731, each of which was filed Jul. 19, 2004, and each of which is a continuation of application Ser. No. 09/236,366, filed Jan. 21, 1999, now U.S. Pat. No. 6,807,632, which claims the benefit of provisional application No. 60/072,316, filed Jan. 23, 1998.

This application also is a continuation of prior application Ser. Nos. 10/893,839, 10/894,284, 10/894,330, and 10/894,450, each of which was filed Jul. 19, 2004, is entitled CONTENT ADDRESSABLE INFORMATION ENCAPSULATION, REPRESENTATION AND TRANSFER, and is a continuation of application Ser. No. 09/236,366, filed Jan. 21, 1999, now U.S. Pat. No. 6,807,632, which claims the benefit of provisional application No. 60/072,316, filed Jan. 23, 1998.

Each of the applications listed above is incorporated by reference herein in its entirety. This application is related to U.S. patent application Ser. No. 09/235,146, filed Jan. 21, 1999 (now abandoned), which also is incorporated herein by reference.

BACKGROUND OF THE INVENTION

1. Field of the Invention

The present invention relates generally to methods and apparatuses for encapsulating information, identifying the information, representing the information, and facilitating the transfer of the information between users, between remote storage and an originating user, or between remote storages using computers and digital telecommunication networks.

2. Description of the Related Art

Digital information must often be identified to be in a particular state, denoted by the status of an asset (such as a file) as of some event or time. Such assets include traditional data files, multimedia files and fragments, records from structured databases, or any other string of digital information used wholly or in part by some application or device. Digital information is highly subject to change and few methods are available to inspect the contents of the digital information to reliably recognize whether it has been changed since some prior time or event. Normal attempts to improve or perfect the content, inadvertent commands or actions which change the content, or tampering by others unknown to primary owners of the digital information are difficult to detect. As such, computers users have no convenient mechanism for establishing the origin or integrity of particular content versions.

Another problematic attribute of digital information (such as a computer file) is that copies may exist which are identical in content but differ in the meta data that the computer system uses to relate to the digital information. Such meta data includes the date/time recorded for the creation or last modification of the file, the file name associated with the file and other information. The meta data may imply that otherwise identical copies of digital information are different when in fact they are not. Such confusion makes it difficult to avoid unnecessary duplication of content on a single computer or on a collection of computers on a network. This confusion may also result in the unnecessary coping of such data files across networks or from other media when, in fact, a particular data file needed is readily available on a computer system or network already.

The existence of a particular file under multiple names has a counterpart problem. Data on computer systems can generally only be accessed through identifiers or location mechanisms which to a greater or lesser extent include information about the location of the file in the storage of the computer. That means that a user accesses the data through stored or remembered names which include elements which are readily changed by others. For example, files within a sub-directory are at risk if someone changes the sub-directory name. If changed, the path to a file becomes invalid, and all of the stored or remembered names of files become invalid as well. This fragile approach to location of data by location leads to many kinds of problems for users and administrators of computer systems, particularly those working with networked systems.

Finally, there is no convenient way for computer users to identify collections of specific versions of digital files. No robust mechanism exists for computers or their users to refer to collections of specific copies or versions of digital files without creating a new entity which incorporates copies of the files into a new form. Many mechanisms have been created to combine such copies into what are commonly called archive files. Examples of archive utilities include the "tar" archiving facility common on UNIX systems and the various "zip" programs on personal computers. Such solutions create additional copies which are often proliferated to many systems. The difficulty of such solutions is that often exact digital copies of many of the files in an archive are already present on the systems to which they are copied. In fact, on many computer systems there are many copies of digital files whose contents are exactly the same. This duplication of identical content is difficult to avoid using existing techniques.

The result of these problems is that duplicate copies of digital files are frequently stored on computer storage devices (at expense to the owner of the system) or transferred on media or telecommunications devices (at further expense to the system owner and the telecommunications provider). This duplication strains limited resources and causes needless confusion on local private networks (local area networks, for example) and on collections of systems connected by digital telecommunication networks. One problem with extra copies is that one might think they are different when they are in fact the same (and copies are needlessly stored), or when they are different, one might think they are the same because of the same file name.

The inability of systems to reliably distinguish different versions of files with the same identifier or to recognize identical files with different identifiers wastes network resources and creates confusion when files are transferred between users of a network. Often, it is essential that users know that they are working on the same document or know that they are working with the same version of an application. For example, when an electronic mail (e-mail) message is sent from one user to another, an attached computer file containing an application or a document is often sent as well. Files may also need to be transferred so that applications can be distributed. Sending an e-mail message with an attached file or using a point-to-point scheme in a network to distribute files can be inefficient in terms of the amount of network bandwidth that is used. For example, when a user attaches a number of files to an e-mail message, it may be that a copy of one or more of those files is already stored on the intended recipient's hard drive. In such a case, the network bandwidth used to transfer the attached files is wasted. If the files could be reliably identified and the files' contents could be reliably verified, then the recipient could simply retrieve the files from his own hard drive or from a local network server and verify that they are indeed the files that are attached to the e-mail message.

A similar problem occurs in managing computers on a network and making sure that the computers are configured in a certain way with certain applications. For example, when a small change is made to an operating system or to hardware that is available to the network, certain files may need to be transferred to each computer on the network. A given computer may have most or almost all of the necessary files loaded and only a few files may need to be provided or updated from a central source. In many cases, the requesting computer and the source computer are far from one another and are connected by a data link that operates at a slower speed than a local data link would operate. Currently, it is necessary to keep track of both the files that are on the requesting computer and the files that need to be added so that proper updates can be made. It would be useful if there existed a way to specify all of the files that are to be transferred and to encapsulate that specification in such a way that would allow the files to be retrieved from the most convenient place (locally, if possible). It would further be useful if such a method would allow the files to be reliably verified as the correct files.

When files are distributed on a local area network (LAN) from a source outside the LAN, the problem can be even more serious. For example, when a company such as Netscape Communications Corporation provides a new web browser on their web site, hundreds or even thousands of employees at a single company attempt to download the browser from Netscape's web site. This is perhaps the most inefficient way for the required software to be distributed within a company. It would be more efficient, for example, if one coworker could reliably retrieve needed files from another. If the necessary files could be somehow uniquely identified in a manner that would allow the actual data in the files to be obtained from the most convenient source, then all of the outside bandwidth used up when all the users download files from an outside source could be saved. In addition, users would obtain access to the files much faster as well.

The problem of specifying a set of files to be stored on various computers and ensuring that the correct files are stored on the computers in a network is described in U.S. Pat. No. 5,581,764 issued to Fitzgerald et al. Fitzgerald teaches a method of distributing resources over a computer network. The method involves generating Already Have and Should Have lists for each of the computers on the network and comparing a Last Updated Date/Time (LUDT) field in the Should Have list to a Last Synchronized Date/Time (LSDT) in the Already Have list. The differences between Should Have lists and Already Have lists for individual computers are used to determine which items must be compared to update individual desktops. This mechanism is dependent on the integrity of system clocks and date settings which are unreliable due to accidental or malicious entry of false settings. Furthermore, the mechanism fails in principle when dealing with the identification of identical files from different systems. An alternative to the Fitzgerald method that would not require detailed comparisons of update and synchronization times yet would still allow files to be reliably specified and would allow needed files to be reliably identified would be useful.

U.S. Pat. No. 5,710,922 issued to Alley et al. describes a method for synchronizing and archiving information between computer systems. The records are identified with a unique identification indicia and an indicia that indicates the last time that the record was altered. Using the time of the last synchronization information, each of the selected records that was added to or deleted from one of the computer systems since the last synchronization is identified and added to or deleted from the computer system. Certain techniques and operations can falsely indicate changes to records which have not, in fact, changed. Furthermore, identical copies of digital files on different systems are not readily recognized as the same because the mechanism in Alley provides no mechanism to do so. Again, it would be useful if a method for synchronizing file systems could be developed that would not require or depend upon analysis of update and synchronization times.

In general, there is a need for a more reliable, flexible and verifiable way of specifying states of known data assets (such as computer files) and of providing access to those unique data assets, particularly over networks. Currently, network sites that are sources of data may be mirrored and various load-balancing schemes have been devised for distributing load among servers that provide data. However, no truly distributed system has been devised for sharing and providing access to data whereby data may be reliably and automatically retrieved from any place where it may be found on a network, instead of from specified locations which are designed to store and provide access to data.

In view of the foregoing, there is a need for methods and apparatuses that reliably and verifiably transfer files while allowing the site that is receiving the files to obtain the files from the most convenient source. Further, it is desirable for such techniques to obtain files in an efficient manner, to obtain the files locally if possible, and to verify that the content of an obtained file is the same as the content of the file that is intended to be transferred. There is also a need for methods and apparatuses that minimize the data stored or transferred within a system or network. It would be desirable for such techniques to provide a reliable mechanism for identifying, locating, and accessing data by its contents rather than by exclusively using the meta data traditionally stored on computer systems.

SUMMARY OF THE INVENTION

Accordingly, a system and method are disclosed for representing digital information in an electronic paper clip, or "e-CLIP"™. An e-CLIP is a reproducible, reliably unique identifier for a collection of digital information, derived from the content of the digital information itself. In one embodiment, an e-CLIP is an alphanumeric reference. An e-CLIP may represent a file, a group of files, a group of file identifiers, or other collections of data or database information. Such other collections of data or database information might include selected database records from a relational, hierarchic, network or other format database, selected frames or clips from digital audio or video streams, messages from streams of message records or files, log entries from audit or status logs of systems, subsystems and/or applications or any other digital assets, the status of which at some instance in time is of unique importance in some context. The original form or context of each digital asset is irrelevant so long as applications provide each such asset uniquely to the mechanism or system embodying this invention. It operates on each unique asset and associated meta-data as described to produce a unique and useful identifier which enables creation of persistent storage of the related assets for future reproduction of the originals.

A cryptographic hash function is used to compute an identifier for the data being represented. Each binary asset is treated as a potentially unique binary sequence. That is to say that any binary entity has a series of binary digits which, in sequence, follow a potentially unique pattern of finite length. Thus, a binary asset at an instant in time is a binary sequence which may or may not be unique. The use of a cryptographic hash function establishes a digital fingerprint or signature that virtually uniquely identifies the binary sequence. The cryptographic hash binary sequence identifier is also referred to as a content-addressable or content-based name for the data. When a group of files or other digital assets is represented, an identifier is generated for each of the files using a cryptographic hash function and placed in a descriptor file. The descriptor file also includes meta data such as arbitrary directory structure (including relational or hierarchical relationships) information as well as file, record, or other asset meta data such as file, record, or asset name, size, date and time stamps and other descriptive data or attributes. In addition, the descriptor file includes context information about the creation of the collection (time and date of creation, user ID of the creating user, etc.). A cryptographic hash descriptor file identifier (or descriptor file hash) is then computed for the descriptor file.

An e-CLIP includes the descriptor file hash and may also include a file locator such as a file name or URL that gives a source where the descriptor file may be obtained if it is not found locally in a convenient storage location. The binary sequence hashes and descriptor file hashes (a special case of binary sequence hash) are provably unique identifiers of the relevant binary sequences. As such, they form a foundation for the storage and retrieval of those sequences as files, database records, or other digital entities using the hashes as asset identifiers (keys, locators or other mechanism). Such an approach can be said to provide "content addressable" storage as the hash is derived from the binary sequence itself, the digital content.

In one aspect, the present invention is advantageous in that meta data associated with each file/record/asset, other data associated with each or all of those assets, and context data about the collection is also included in the descriptor file. Thus, when the descriptor file is obtained, the recipient also receives important meta data about each asset and context information about the collection. The meta data may be used to further verify a file/record/asset, to indicate ownership, to show modification dates, or to provide other needed information about each file. In addition, an embodiment of the present invention is advantageous when file directory structure is also included with the file list. Having such file directory structure is helpful in determining how to organize files amongst their respective folders. For example, after data is lost on a particular computer, the file list can be used to not only identify lost files, but also to reorganize the files into the appropriate directory structure. Similarly, meta data about database records cataloged in a descriptor file can be used to identify tables or files to which those records pertain. Such parallels can be drawn with other forms of digital asset like audio or video clips, etc.

An e-CLIP functions as a "key to a box of keys" where the box of keys is the descriptor file and the keys are the binary sequence identifiers (or binary sequence hashes). The use of the term "key" has no cryptographic or other meaning in the context of this invention. An e-CLIP is useful for identifying groups of files that have been backed up, are being transferred, etc. At some point, a user (or system) may wish to access the files starting with nothing more than the e-CLIP.

Once the descriptor file (or box of keys) is found using the e-CLIP, each of the files/records/assets corresponding to the binary sequence identifiers in the descriptor file may likewise be found using their respective unique binary sequence identifiers. When a particular binary sequence is obtained from a source, the cryptographic hash function is used to recompute the binary sequence identifier to verify that the asset obtained is the correct asset that was intended to be accessed. There is no restriction on the data, meta data or file system structure that can be stored and referenced by an e-CLIP.

It should be appreciated that the present invention can be implemented in numerous ways, including as a process, an apparatus, a system, a device, a method, or using a computer readable medium. Several inventive embodiments of the present invention are described below.

In one embodiment, a system and method are disclosed for representing a plurality of assets (files, records, or other digital assets). The method includes selecting the plurality of assets (binary sequences) to be transferred. A plurality of cryptographic hash binary sequence identifiers are generated for the plurality of assets. Each of the plurality of cryptographic hash asset identifiers is computed from the contents of a particular asset. A descriptor file is generated that includes the plurality of cryptographic hash binary sequence identifiers computed from the plurality of assets to be transferred. A cryptographic hash descriptor file identifier is generated that is computed from the descriptor file. The computed cryptographic hash descriptor file identifier may be included in another list of identifiers, and so on, so that complex structures can be reduced and represented in extremely compact form.

In another embodiment, a method of identifying an asset is disclosed. The method includes selecting an asset to be identified. A cryptographic hash asset identifier is obtained for the selected asset. A copy of the asset is obtained and the integrity of the copy of the asset is verified by regenerating the cryptographic hash file identifier from the copy of the asset and comparing to the cryptographic hash asset identifier of the asset being identified.

BRIEF DESCRIPTION OF THE DRAWINGS

The present invention will be readily understood by the following detailed description in conjunction with the accompanying drawings in which.

DETAILED DESCRIPTION OF THE INVENTION

Reference will now be made in detail to the preferred embodiment of the invention. An example of the preferred embodiment is illustrated in the accompanying drawings. While the invention will be described in conjunction with the preferred embodiment, it will be understood that it is not intended to limit the invention to one preferred embodiment. On the contrary, it is intended to cover alternatives, modifications, and equivalents as may be included within the spirit and scope of the invention as defined by the appended claims. For example, for ease of understanding, many of the figures illustrate use of the invention with traditional computer files. As described herein, however, the present invention is suitable for use with any digital asset or binary sequence.

In the following description, numerous specific details are set forth in order to provide a thorough understanding of the present invention. The present invention may be practiced without some or all of these specific details. In other instances, well known process operations have not been described in detail in order not to unnecessarily obscure the present invention.

Overview

The present invention provides a technique and mechanism by which a reliably unique binary sequence identifier (also referred to as a binary sequence hash or a cryptographic hash binary sequence identifier) is generated for each binary sequence in a user-defined collection of binary sequences (digital assets). These binary sequence identifiers are stored within a descriptor file of the present invention so that true and accurate copies of those collected files can be identified and/or verified when a collection is reconstructed or validated. Further, a reliably unique descriptor file identifier (or descriptor file hash) is generated for the descriptor file to serve as a representation of the collection of files.

The present invention makes it possible to inspect any collection of digital assets to establish whether each asset in the collection is or is not present on a particular computer system or network without having to provide a reference copy of the entire asset or relying on potentially misleading extrinsic naming or locational information. In this way, only those assets that can be proven to be missing from the system or network need to be obtained from other sources in order to reproduce the collection of assets. The preferred embodiment of the present invention primarily deals with digital assets which are data files. Appropriate interfaces would make it simple to extend the preferred embodiment of the invention to work equally well with digital assets which were records from structured files and databases of all types, selections or clips from streams of multimedia data (digital audio or digital video, for example) or selections or subsets of other structured or unstructured digital data (binary sequences).

A preferred embodiment of the present invention uses one of a class of cryptographic hash functions that uses the contents of a digital asset to produce a unique binary number by mathematical and/or logical operations. Such functions are commonly used in encryption of digital information and an extensive body of art exists documenting alternative methods for generating such a unique binary number for virtually any specific combination of digital data. A preferred embodiment uses the well-known MD5 algorithm. It should be recognized that numerous other algorithms for generating reliably unique asset identifiers may be used as well. Preferably, an algorithm should consistently produce the same binary number for any specific instance of a digital file and such a binary number should be practically proven to be unique with a reasonably high probability for the class of binary files being identified. With such an algorithm it could be proven that cryptographic hashes over two binary sequences that result in the same cryptographic hash (binary number) prove that the two binary sequences are the same. Conversely, cryptographic hashes over two binary sequences that result in different cryptographic hashes (binary numbers) prove that the binary sequences are different. Such an algorithm simplifies the identification of copies of a particular binary sequence.

Figure 2:
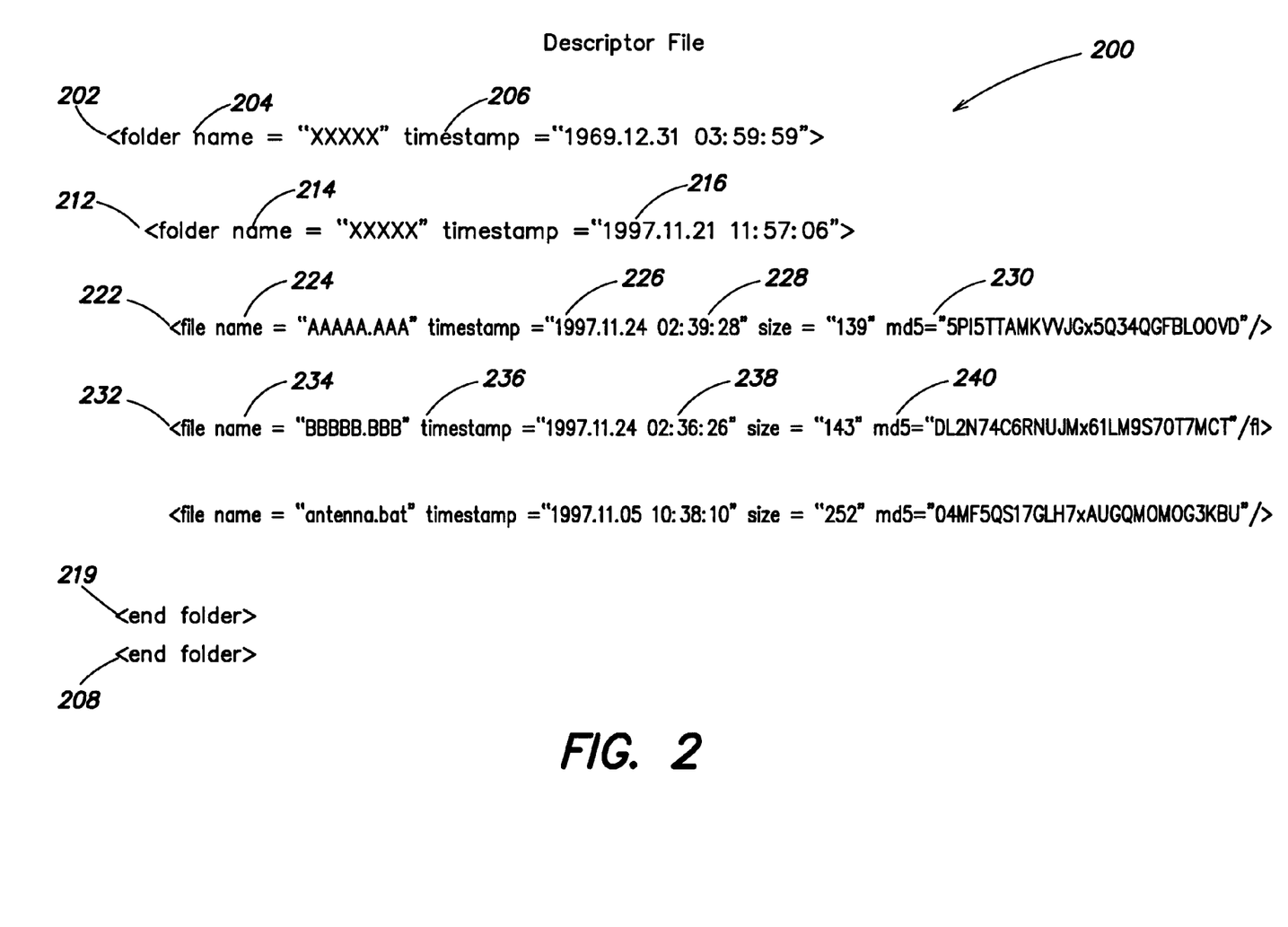
FIG. 2 is a diagram illustrating the structure of a descriptor file.

A user-defined collection of digital assets, related meta data and context information are grouped to produce a descriptor file. One example of a descriptor file is shown in FIG. 2. Hence, the descriptor file can be characterized as a box or list of keys to digital assets; in addition, it contains other information about those assets. This box of keys is then treated as an independent digital asset, and its own key is then derived from its unique content. The resulting key is the "key to the box of keys" and may be used to form an e-CLIP that represents the collection of digital assets.

A user or system can obtain an e-CLIP from any trusted source. The e-CLIP can then be used to find or identify a precise copy of the descriptor file that in turn further includes the collection of asset information. Once a copy of an original asset is found using the present invention, that asset can safely be treated as a precise copy of the original asset. If the asset is a descriptor file, it can be read or opened and the cryptographic hash binary sequence identifiers for the collection of digital assets can be obtained. The files corresponding to those binary sequence identifiers may be obtained and verified by a comparison of the provided binary sequence identifiers with binary sequence identifiers newly derived using the cryptographic hash function.

If the files identified in a descriptor file cannot be found, then the collection of files cannot be reconstructed. This is a potentially frustrating fact. Nevertheless, the described method provides a mechanism by which collections of files can be reproduced reliably or can be proven to be unavailable with equal reliability.

In a preferred embodiment, a descriptor file is created by generating a cryptographic hash binary sequence identifier for each digital asset in a selected collection of digital assets. The cryptographic hash binary sequence identifier is generated by using a cryptographic hash function on the actual data content of each of the assets. In some embodiments the entire asset is used to generate the cryptographic hash binary sequence identifier, and in other embodiments, a portion of the asset is used. Preferably, a sufficiently large portion is used to ensure a probability that the cryptographic hash binary sequence identifier is unique. In different embodiments, different cryptographic hash functions are used. In a preferred embodiment, the MD5 algorithm is used to generate a 128-bit number that represents the file. The 128-bit number is represented as a 26-character alphanumeric string by translation to base 36 numbers that are then mapped to the set of alphabetic and numeric characters in the base ASCII character set. In the preferred embodiment, a flag character is included at a predetermined position within the resulting string bringing the total length of the string to 27 characters. This mapping is referred to as "ASCII Armoring" and is commonly used to render binary information in a limited character set for transmission over protocols that require content to be constrained to alphanumeric binary coding.

As is described below, this particular representation of a cryptographic hash binary sequence identifier has the advantage of being human readable and easily communicated for use, e.g., by being written down, transmitted by software, retrieved by data query, coded into software application file requests, referenced by a content or asset management system, requested in an object browser, electronically copied and pasted from one document to another, sent via electronic mail, etc.

A cryptographic hash function such as the MD5 algorithm is used in one embodiment to generate the cryptographic hash binary sequence identifier because cryptographic hash functions have been mathematically proven to minimize the probability that similar assets will be mapped onto the same cryptographic hash binary sequence identifier. This is important because the cryptographic hash binary sequence identifier is used as a unique assets identifier and the generation of the same cryptographic hash binary sequence identifier from two assets is assumed to conclusively show that the assets are identical. Conversely, it is equally useful to note binary sequences which are not the same will produce different binary sequence identifiers and such results can conclusively show two binary sequences are not identical. The MD5 algorithm produces a high confidence level and is thus highly reliable as a technique for producing a unique assets identifier.

Other hash functions or other types of functions based on the binary sequence (content) may be used to generate assets identifiers so long as the probability of generating identical identifiers from different files is below a threshold that is defined as acceptable.

Once the cryptographic hash file identifier for each of the selected assets is generated, it is included in a descriptor file along with other assets information in a descriptor file. The other assets information included with the file list may include directory information about how the assets are organized within a computer system, as well as file names, file sizes, time and date stamps for each assets, ownership of the asset, and other asset meta data as is described below. The descriptor file may also include data about the context or implications of the collection of assets, the purposes for which the collection is being created, or any other information. Then, in a preferred embodiment, the descriptor file is stored in a digital file in a suitable form for the type of computer system of other environment in which the descriptor file resides. In other embodiments, the descriptor file might be stored in a database or other digital repository providing convenient, efficient, and secure storage and retrieval capabilities. A cryptographic hash binary sequence identifier for the stored descriptor file is then computed which, in one embodiment, becomes the e-CLIP by which the collected assets may be referenced, found, and verified. It should be recognized that the e-CLIP that identifies the collection may be produced by the same algorithm used to compute the cryptographic hash binary sequence identifiers for the individual assets named and listed within the descriptor file. In other embodiments, the binary sequence identifier for the descriptor file is combined with other information (such as a file locator) to form the e-CLIP.

e-CLIP Generation

Figure 1:
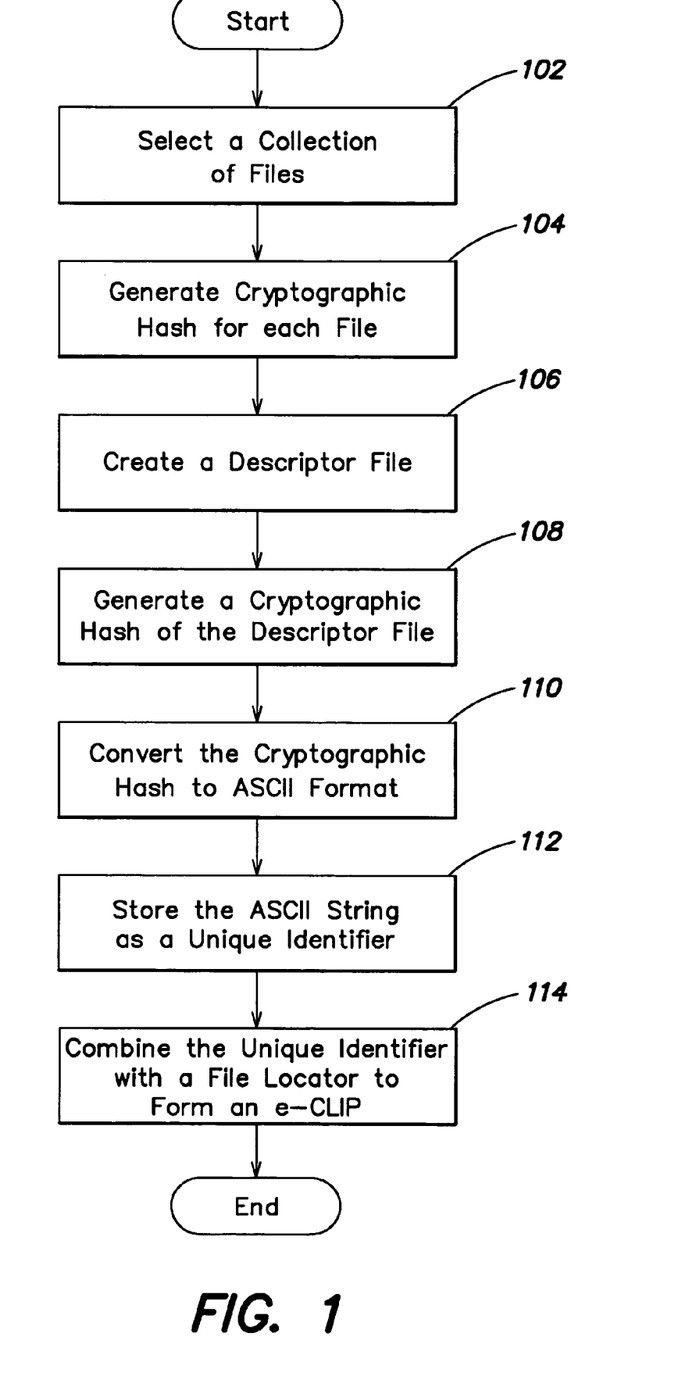
FIG. 1 is a flowchart illustrating a process for creating a cryptographic hash descriptor file identifier of a descriptor file, including file meta data for the assets in the list.

FIG. 1 is a flowchart illustrating a process for creating a cryptographic hash binary sequence identifier of a list of assets, including meta data and context data for the assets in the list. In step 102, a list of assets which are to be represented is selected and the asset data, meta data, and/or context data is collected. The list of assets may include multiple assets, only one asset, or no asset. The list of assets may even include previously created descriptor files or assets that include an e-CLIP. If a descriptor file contains no digital assets (files, database records, multimedia clips, etc.), then the descriptor file to be created may contain other data that is used to locate and obtain digital assets using a selected scheme or may contain valuable collections of meta data and context data without reference to independent binary sequences. In such a case, a cryptographic hash binary sequence identifier for the descriptor file still ensures the integrity of the data in the descriptor file.

When at least one asset is selected, in step 104 a cryptographic hash binary sequence identifier is generated for each of the assets selected. As noted above, in one embodiment, the MD5 algorithm is used to generate the cryptographic hash binary sequence identifier. Thus, a cryptographic binary sequence hash is used as an asset identifier for each of the assets. In step 106, a descriptor file is created using the meta data associated with each asset, meta data about the assets, and context data about the collection, and the cryptographic hash binary sequence identifiers generated in step 104. An example of a descriptor file is shown in FIG. 2 below.

In step 108, a cryptographic hash is generated of the descriptor file itself. Each of the cryptographic hash binary sequence identifiers in the descriptor file may be thought of as a key to the digital asset which the cryptographic hash file identifier identifies. Thus, the descriptor file can be thought of as a collection or "box" of keys. The cryptographic hash binary sequence identifier of the descriptor file is referred to as a cryptographic hash binary sequence list identifier and can be thought of as the key to the box of keys that are listed in the descriptor file. The cryptographic hash binary sequence list identifier is used to locate and verify the descriptor file. The contents of the descriptor file are then in turn used to locate and verify each of the assets represented in the descriptor file. In step 110, the cryptographic hash binary sequence list identifier is converted to ASCII format. As noted above, in one embodiment, a 128-bit file list identifier is converted to a 27-character base 36 ASCII string. The 27-character string is thus in human readable text form and may be copied manually or electronically for processing, reference or storage.

In one embodiment, the cryptographic hash binary sequence list identifier is stored as a bar code. This is particularly useful when identifying information about an object is placed on the object itself. For example, an appliance such as a microwave or a VCR could have a bar code placed on the appliance that represents a cryptographic hash binary sequence list identifier that was generated from assets that include the manual or other documentation related to the appliance. Thus, the manual and related documentation can be obtained by: scanning the bar code; reading the descriptor file identifier; obtaining the descriptor file that corresponds to the descriptor file identifier; reading the descriptor file and the individual binary sequence identifiers within it; obtaining the digital assets that correspond to the binary sequence identifiers; and finally, reading the obtained assets that contain the manual and related documentation. Similar coding in other indices or software applications can be used to specify, search for, and acquire other digital assets containing data or software code.

In step 112, the ASCII string is stored as a unique identifier or e-CLIP. The unique identifier is easily read or copied by either human or electronic means. Next, in step 114, in certain embodiments, the unique identifier can be combined with a file locator (as an e-CLIP hint) to form the e-CLIP. The file locator indicates a possible location of the purported descriptor file and associated digital assets (binary sequences). It should be noted that in many embodiments, e-CLIPs do not need to include a descriptor file locator (e-CLIP hint). However, the inclusion of a descriptor file locator as the place where the descriptor file may be found is beneficial in many instances, and especially if the descriptor file or one or more associated digital assets is not found in a convenient location first.

Thus, the e-CLIP is represented by a unique identifier which, in one embodiment, is a human readable version of a cryptographic hash binary sequence list identifier. The cryptographic hash binary sequence list identifier is a unique reference to information of arbitrary size, type, complexity, and file structure. That is, the cryptographic hash binary sequence list identifier may represent any number of digital assets further described by any amount of relevant meta data about file system structures, database relationships, multimedia content information, or other useful information. An example of a directory structure specified in a descriptor file is shown in FIG. 2.

FIG. 2 is a diagram illustrating the structure of a descriptor file 200. The particular descriptor file shown uses a "hyperfile" modeling language (HFML) based on XML to describe the structure of the directories containing files as well as the files themselves. An HFML is described in the provisional patent application referenced above. In general, it should be noted that implementation of an e-CLIP is not restricted to a descriptor file written in this syntax. The HFML in the preferred embodiment is used because it is readily parsed and can be used to generate a tree-structured directory of the files and keys contained in the descriptor file. This example restricts itself to a description of files and keys from a particular form of computer and software. The invention provides for extension of the languages or codes used to create descriptor files to describe virtually any digital asset, relationships, and other meta and context data without limitation.

The first item in descriptor file 200 is a folder 202. A folder name 204 as well as a time stamp 206 are included in folder 202. Folder 202 matches up with an end folder tag 208 that marks the end of folder 202. Nested inside of folder 202 is a first nested folder 212. Folder 212 includes a folder name 214 and a time stamp 216. A file 222 is included inside of folder 212. File 222 includes a file name 224, a time and date stamp 226, a size 228, and a cryptographic hash file identifier 230 generated by the MD5 algorithm and represented as a 27-character string. Likewise, folder 212 also includes a file 232. File 232 includes a file name 234, a time and date stamp 236, a size 238, and a cryptographic hash file identifier 240. Folder 212 matches with an end folder tag 219.

It should be evident that an arbitrary number of folders can thus be represented and nested within other folders as desired, so that an arbitrary tree-shaped directory can be specified with an arbitrary number of files specified in each of the folders of the directory. Each of the files may include a file name and other meta data as desired plus a cryptographic hash binary sequence identifier that uniquely identifies the file based on the content of the file. In some embodiments, the cryptographic hash binary sequence identifier is the only identifier for the file; in other embodiments a conventional file name is also associated with the file.

Thus, it will be appreciated that when the descriptor file specified by an e-CLIP is recovered (for example, after a computer crash) and where the descriptor file contains definitions of computer files (possibly in addition to other digital assets), complete file name and directory information for the files that are specified by the e-CLIP is obtained. The process of retrieving the descriptor file and finding the files specified in the descriptor file is described in FIG. 3 below.

File Retrieval

Figure 3:
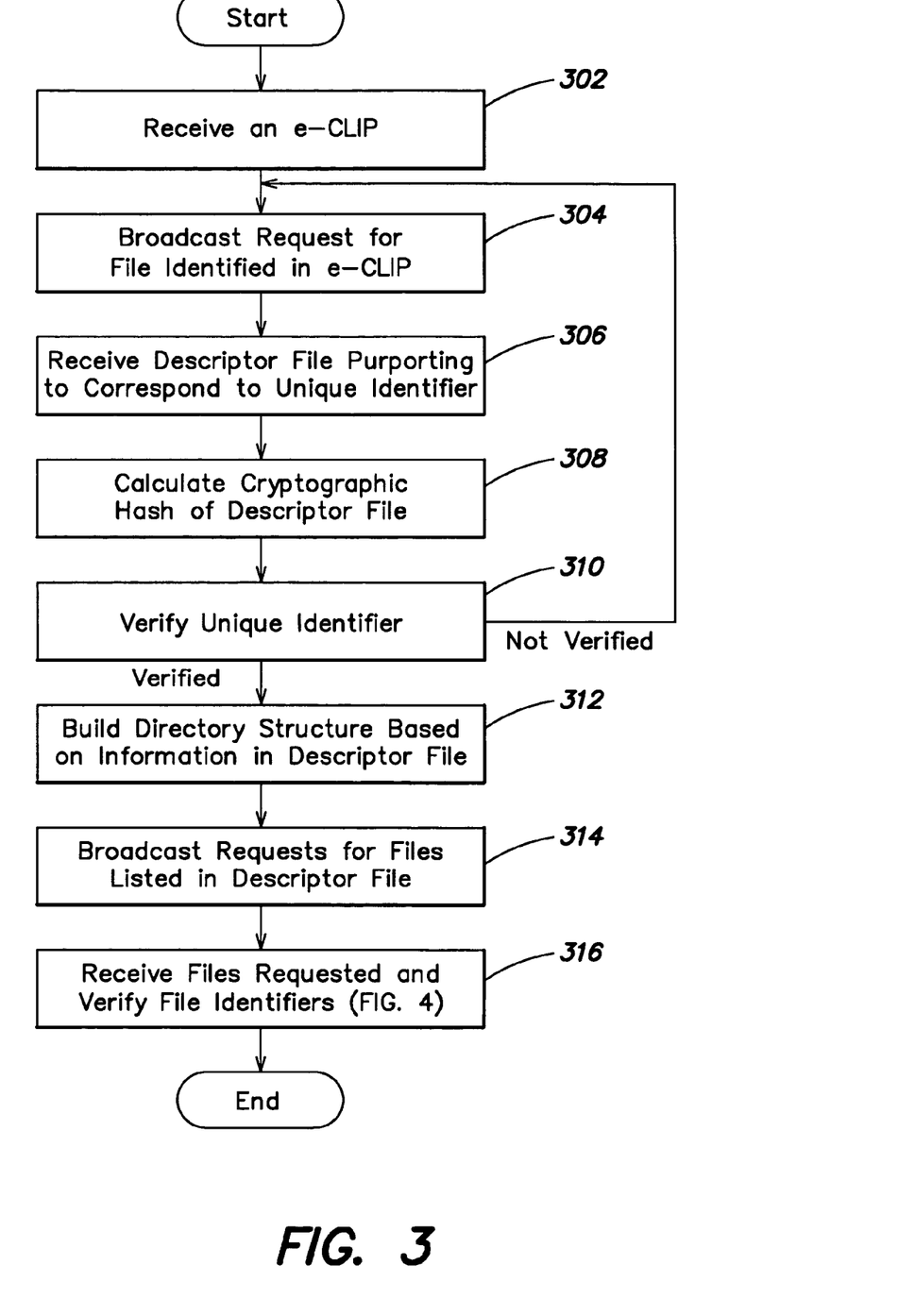
FIG. 3 is a flowchart illustrating a process for using an e-CLIP to find both a descriptor file and the assets specified in the descriptor file.

FIG. 3 is a flowchart illustrating a process for using an e-CLIP to find both a descriptor file and the digital assets (binary sequences) which, in this example, are files specified in the descriptor file and for putting the files in the directory structure specified by the descriptor file. In step 302 an e-CLIP is received. The e-CLIP may be received embedded in an e-mail message where the e-CLIP is being used by a user to specify a set of files. Alternatively, the e-CLIP may be generated automatically by a network device performing the backup of the files and directories specified in the e-CLIP. The e-CLIP may be produced by a business applications, sealing the relevant digital assets relating to a particular transaction. In addition, e-CLIPs may be generated for other reasons by any user, network node, application or hardware device that needs to uniquely specify a file or group of files for some purpose. Such e-CLIPs may be embedded in and readily accessed from database applications, legacy applications running on mainframes, text retrieval applications, web sites, etc.

In step 304 the recipient of the e-CLIP broadcasts a request for the file corresponding to the unique identifier found in the e-CLIP. Next, in step 306 the e-CLIP recipient receives a descriptor file purporting to correspond to the unique identifier. Next, in step 308 the recipient calculates the cryptographic hash of the descriptor file received using the same cryptographic hash function that was used to generate the unique identifier found in the e-CLIP. In step 310 the recipient verifies that the unique identifier found in the e-CLIP matches the result of the cryptographic hash of the descriptor file. If the unique identifier is not properly verified, then control is transferred back to step 304 and the request for the file identified in the e-CLIP is sent again. An error message or other notification may be generated as well.

Figure 6A:
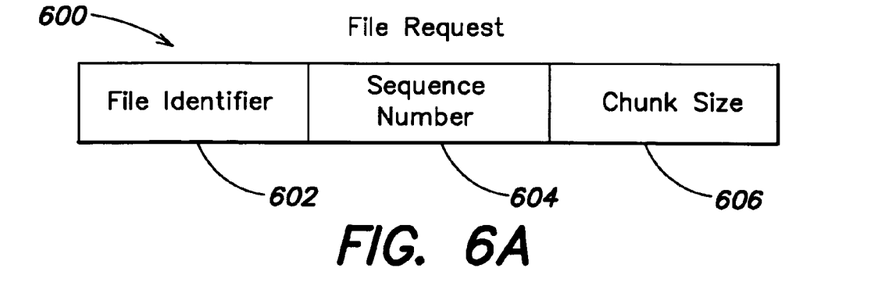
FIG. 6A is a block diagram illustrating the structure of an asset request generated by an importer as described above in step 402.

If the unique identifier is verified in step 310, then control is transferred to step 312 and the recipient builds the directory structure specified in the descriptor file. Programming logic is applied to perform system configurations and file operations to create the required directories, using programming operations such as those described by HFML, for example. Preferably, each folder in the directory is created according to the specified structure. Next, in step 314 the recipient of the e-CLIP broadcasts a request for the files listed in the descriptor file. FIG. 6A shows an example structure for a file request.

Responses offering copies of the requested files are analyzed and copies of the files are retrieved from the most effective sources available including local file systems, local networked file systems available to the system on which the recipient is executing, standard networking protocols such as the File Transfer Protocol (FTP), or through any other networked protocol as may be devised or specified.

In step 316 the recipient of the e-CLIP receives the files requested and verifies the file contents by generating cryptographic hashes of the file data and comparing the results to the file identifiers listed in the descriptor file. If any files fail the verification test, then those files are requested again and an appropriate notification is generated. The process then ends.

Thus, a recipient of an e-CLIP broadcasts a request for the descriptor file identified by the unique identifier in the e-CLIP. Once the descriptor file is received, the e-CLIP recipient is able to verify that the correct descriptor file has been recovered and then broadcasts requests for the files specified in the descriptor file. Those files are inserted into the directory structure specified in the descriptor file once they are received and verified. The process for broadcasting requests for files, receiving and verifying files, and modifying the broadcast request is accomplished in one embodiment using an importer, which is a small program encoded preferably in the JAVA programming language, or in any other suitable language.

Figure 4:
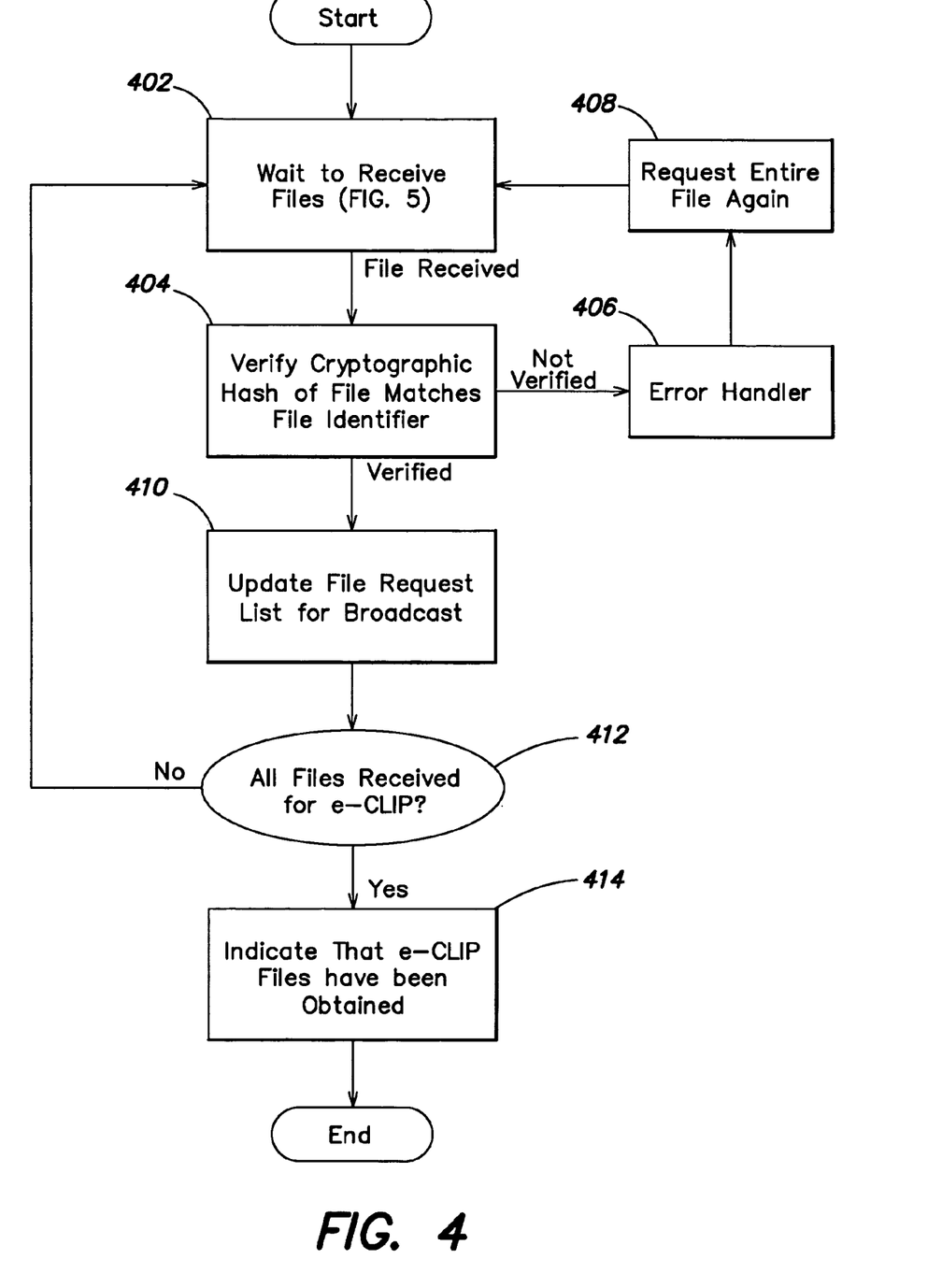
FIG. 4 is a flowchart illustrating a process running on an importer used to receive requested assets and to verify binary sequence identifiers as is specified in step 316 of FIG. 3.

FIG. 4 is a flowchart illustrating a process running on an importer used to receive requested digital assets (binary sequences) which may be files and to verify their file identifiers as is specified in step 316 of FIG. 3. It should be noted that other processes and languages to request and verify such file identifiers may be used within the spirit and scope of the invention. In step 402 the importer waits to receive files. When a file is received control is transferred to step 404. The process of receiving a file in parts and assembling those parts is further described in FIG. 5. In step 404, the importer verifies that the cryptographic hash of the file received matches the file identifier that was sent out requesting the file. If the file identifier is not verified, then control is transferred to step 406 where an error handler is activated. Then, in step 408 a request for the entire file is generated and control is transferred back to step 402.

If, however, the file is verified, then the file request list for broadcasts is updated in step 410 and control is transferred to step 412. In step 412 it is determined whether all the files have been received that were specified in the descriptor file identified in the e-CLIP. If all files have been received, then control is transferred to step 414 and it is indicated that all of the e-CLIP files have been obtained. The process then ends. As long as all of the files have not been received, control transfers from step 412 back to step 402 so that the rest of the files may be received and checked.

It must be noted that the examples used in this description all make reference to files. The assets, however, may be references to database records, video clips taken from within larger video streams, or other digital assets stored to be passed to other software programs or processes. Rather than instantiating directories and creating files with the contents of the digital assets, the recipient would make them available via some other standard application programming interface. The process of requesting the assets, verifying their contents, keeping them in a temporary, quarantine, holding area, and making the collection available after all assets are received and verified is logically the same for any collection of digital assets no matter their type, or source.

This type of digital asset quarantine and verification procedure using content-addressable asset identifiers ensures asset integrity, excludes spoofing and virus infection automatically, and permits automated or manual reconstruction of lost assets. The content-addressable asset identifier system of the present invention is superior to other asset identification systems where identifiers are not derived from the digital asset contents but instead depend on a path name locator, file name, file author, file creation/modification date, file size, or other environmental or application meta-data. Because such prior art identifiers are not content addressable, they may be readily spoofed. By contrast, the verify step 404 of the present invention allows errors in assets to be detected. Advantageously, under the present invention, if errors are detected and a virus or spoofing is suspected, suspect assets may be reconstituted from another location or a more secure method of file transfer may be invoked.

Figure 5:
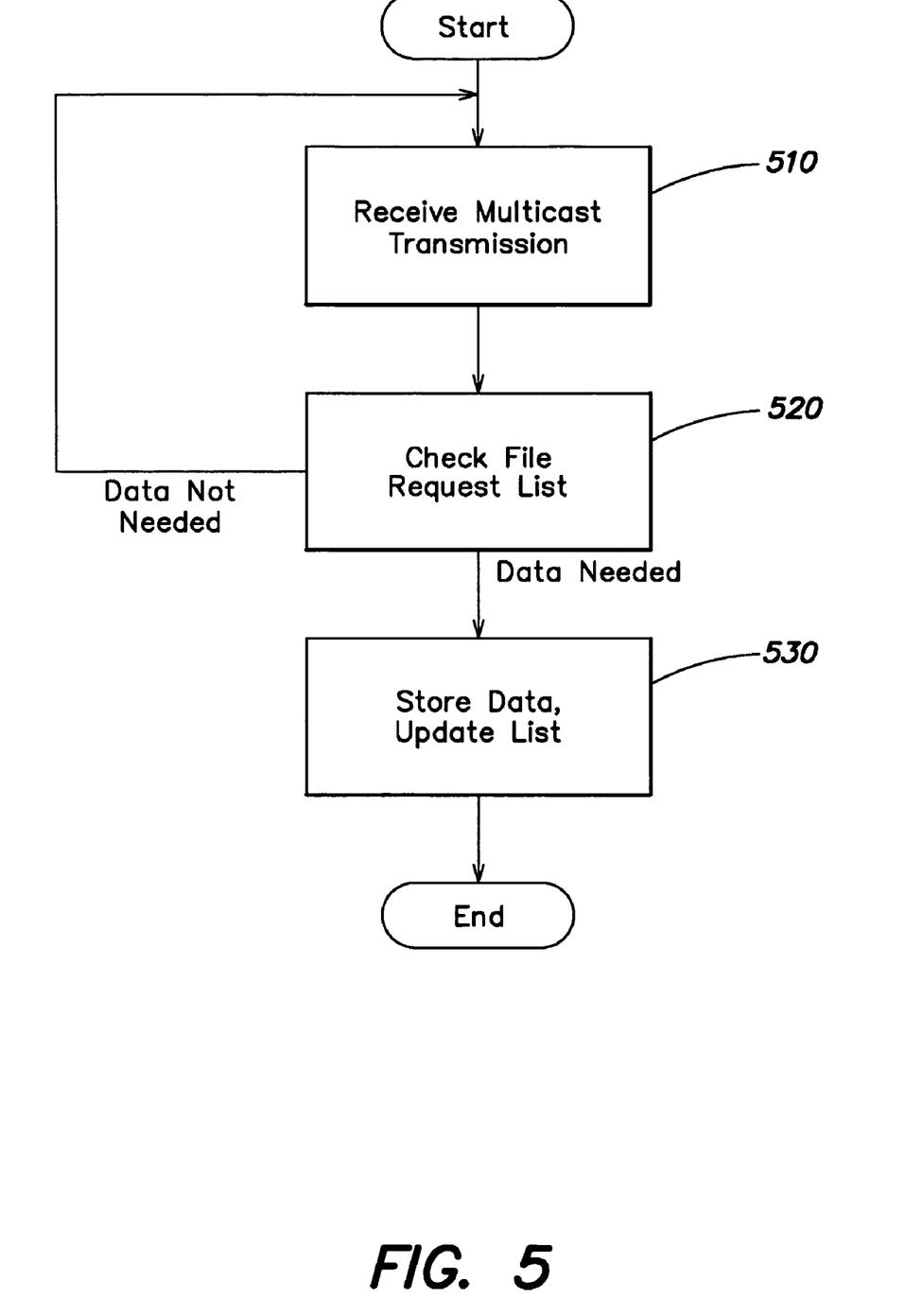
FIG. 5 is a flowchart illustrating one embodiment of step 402 showing how the importer checks multicast transmissions to reconstitute assets that are received in portions.

FIG. 5 is a flowchart illustrating one embodiment of step 402 showing how the importer checks "multicast" transmissions in order to reconstitute assets that are received in portions. Multicast transmissions are transmissions from a peer that are addressed to all peers available on the network. Similarly, a multicast request may be sent by sending a request to all peers available on the network. Peers include any device included in a defined multicast group; a multicast group may include any device accessible over a data link. This method is referred to as "Swiss cheese" method because it fills in assets by placing the chunks of an asset in the proper order and continues to request chunks that are needed to fill in the holes. The method permits multiple source, variable, nonsequential digital asset segment transfer in response to a request using a content-addressable asset name (such as a cryptographic hash asset identifier). Of course, other methods for receiving files may also be used.

In step 510 the importer receives a multicast transmission. Next, in step 520 the importer checks its asset request list (akin to a shopping list) to see if a digital asset portion or segment received is needed. If the asset segment is not needed, control is transferred back to step 510. If the asset segment is needed, then the data is stored in the proper order based on its sequence number in step 530 and the asset request list is updated so that that particular asset segment will not be requested any longer. The process then ends.

It should be noted in the above described protocol that digital assets (binary sequences) are received in parts as portions or segments and that the asset request list includes all of the assets that are being requested until those assets (binary sequences) are received in their entirety. In other embodiments, assets may be received whole or in a manner specified by any file transfer protocol. It is also possible that in some embodiments, an asset segment request list would be implemented that would include individual segments being requested. For example, individual segments of assets may be requested when data or a code patch for a software application is required, or when specific entries for a database are obtained by a store or query result. The importer manages the transfer of assets to the recipient of an e-CLIP and determines when the assets are complete so that the cryptographic hash file identifier specified in the descriptor file may be used to verify that the correct asset has been received. Verification is achieved by comparing the cryptographic hash asset identifier to a newly generated MD5 cryptographic hash asset identifier calculated using the received asset (binary sequence).

FIG. 6A is a block diagram illustrating the structure of an asset request generated by an importer as described above in step 402. A request 600 includes an asset identifier 602, a sequence number 604, and a chunk size 606. The asset identifier is obtained from the descriptor file. The sequence numbers may be generated by the importer based on the size of the asset segments that it will request. The chunk size is specified by the importer in certain embodiments. It should be noted that in other embodiments, the chunk size is specified by the system and is not changeable by individual file importers.

Figure 6B:
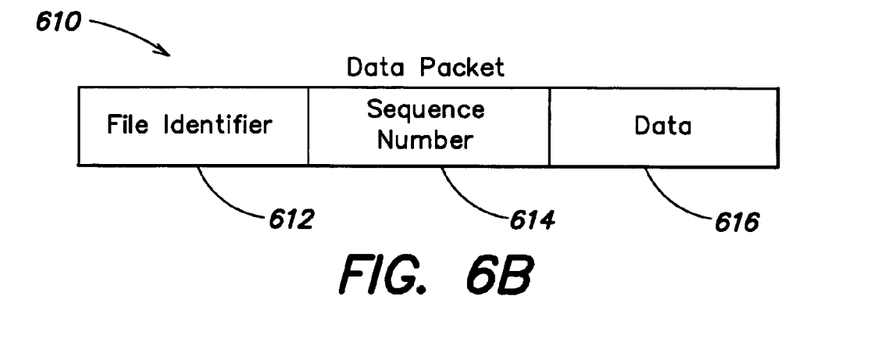
FIG. 6B is a block diagram illustrating the structure of a data packet that delivers file data to a requester in response to a asset request.

FIG. 6B is a block diagram illustrating the structure of a data packet that delivers binary asset data to a requester in response to an asset request. A data packet 610 includes an asset identifier 612, a sequence number 614, and data 616 which represents the asset segment data itself. The length of the data corresponds to the length of the chunk size 606 specified in the request 600. Thus, incoming asset segments can be ordered according to their sequence number and the data in the file can be recovered from the ordered segments once all of the segments have been received. Notably, portions may be received from different sources in nonsequential order and concatenated or filled in to create the target digital asset (binary sequence).

In one embodiment, the importer has a specific hierarchy of locations in a computer system (or on a network) in which it looks for the assets listed in the descriptor file. Thus, the importer may be implemented using a chained system of importers which look for digital assets in different places.

Figure 7:
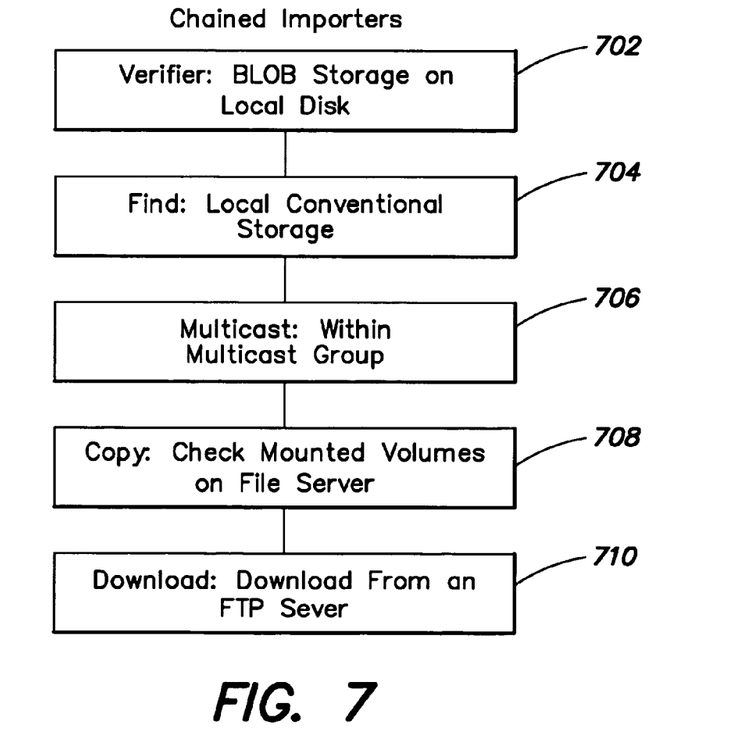
FIG. 7 is a block diagram illustrating one such chained set of importers.

FIG. 7 is a block diagram illustrating one such chained set of importers. A verifier importer 702 attempts to first verify that the digital asset is stored on a local disk in asset storage. Asset storage is an area of local memory reserved for storing data in a binary form in a way optimized for instant retrieval using a cryptographic hash file identifier. If the verifier importer finds the digital asset in asset storage, then the verifier checks the cryptographic hash asset identifier by calculating it and then verifies that the asset in asset storage is actually the asset being requested.

If the verifier importer is not able to find the digital asset in asset storage, then a find importer 704 is enabled to locate the asset (if a file) in local conventional storage, if possible. If the asset is a file and is not found in local conventional storage or is some other form of digital asset, then a multicast importer 706 such as the one described above in FIG. 5 is enabled to broadcast signals within the multi-cast group of the recipient of the e-CLIP to attempt to obtain the assets specified by the e-CLIP. If the assets can not be obtained by the multi-cast importer, then a copy importer 708 is used to look for the asset stored as a content-addressable file on any mounted volumes on file servers that are accessible to the copy importer. If the assets still are not found, then a download importer 710 is used to download the asset stored as a content-addressable file from an FTP server or some other outside source. As noted above, certain e-CLIPs may include a resource locator such as a URL that specifies a specific outside location where the assets stored as files included in the e-CLIP may be found if they are not obtainable by any of the other importers above importer 710. Alternatively, a traditional file transfer request can be used.

Thus, the importers are in a hierarchy and assets are searched for first in the most convenient location and then in progressively less convenient locations. This "assembly line" of importers is configurable in kind and quantity of importers and may automatically and dynamically change to optimize economy, security or performance. Because the cryptographic hash asset identifiers serve as content-based file names that enable the content of assets to be verified once the assets are recovered, it is possible to allow assets to be recovered from arbitrary locations where they may be found without regard to checking the contents of the asset using some sort of check sum. Advantageously, the cryptographic hash asset identifier acts as both a digital asset (binary sequence) identifier and a means for verifying the asset contents.

CONCLUSION

In one embodiment, a system and method has been described for specifying a collection of files having an arbitrary directory structure to be reconstructed from whatever sources are available to the target system. The files are described in a directory structure in a descriptor file and a cryptographic hash file list identifier (e-CLIP) is generated for the descriptor file. The e-CLIP represents the collection of files and may then be transferred, stored, etc.

When the descriptor file is obtained by the recipient using the e-CLIP, the descriptor file is verified as the correct descriptor file specified by the e-CLIP using the same algorithm that was used to generate the cryptographic hash file list identifier. Then, each of the files specified in the descriptor file are recovered using an importer and the files are verified using the cryptographic hash file identifiers for each file. Thus, information is obtainable by a recipient using means more efficient than simply receiving all of the information over one communication line from the information sender's location. The information may be reliably gathered by the recipient of the e-CLIP because the e-CLIP contains cryptographic hash file identifiers for each file that are used to verify the contents of the files.

In addition to specifying files for transfer from one entity to another, the e-CLIP described herein can also be used to create a record of the exact state of any collection of files in a computer at any given time. This is done by generating an e-CLIP that is a cryptographic hash file identifier of a descriptor file that includes directory information for that collection of files in the computer. Preferably, all of the files are first backed up elsewhere for later retrieval if necessary. If the computer files are lost for any reason, the e-CLIP is used to retrieve the descriptor file (which has been stored in a safe location). The descriptor file can then be used to retrieve all of the files that are referenced within it, either a locally or over a network. Preferably, the importers described herein are used to retrieve the files.

Thus, the state of the files in the computer may be recorded exactly by simply generating an e-CLIP for the files, storing the e-CLIP safely, and making sure copies of the files exist elsewhere. The files may be recovered if needed by retrieving the e-CLIP, using the e-CLIP to find the descriptor file, opening the descriptor file, and then using the importers to retrieve the correct versions of all of the files represented therein.

This is an efficient way to back up multiple computers on a network when many of the computers contain the same files. Each computer on the network generates a descriptor file describing all of its files as well as its directory structure. The descriptor file is sent to a central backup computer that makes certain that it contains all of the files specified in each of the descriptor files. The amount of data compression achieved by this scheme can be extremely large when the computers being backed up contain many common files as is the case with Personal Computers on Local Area Networks (LANs). Each file need only be obtained and stored once by the central backup computer and then specified as many times as a necessary in the individual descriptor files that represent the files found on the individual computers.

Subsequent backups of the same computers may be accomplished by generating a new descriptor file which includes file hashes for the new or changed files, and having the central computer store the new descriptor file and all of the newly created or changed files. Thus, new or changed files may be reliably identified and copied to the central backup computer without moving previously archived, unmodified files. Storing periodic backups for each computer can thus be accomplished without requiring prohibitive amounts of file storage since each new backup only requires additional storage for new or changed files.

Similar mechanisms will be embodied which perform archiving of individual records of databases, Web pages, and/or any other digital assets which may be identified by some process and made available to mechanisms identical in nature to those described above.

Although the foregoing invention has been described in some detail for purposes of clarity of understanding, it will be apparent that certain changes and modifications may be practiced within the scope of the appended claims. For example, a wide variety of algorithms may be used to compute a unique file identifier for an asset, and for the descriptor file. Also, the asset list hash may be represented in any suitable form such as binary, another suitable base, ASCII, alphanumeric, etc. The e-CLIP, descriptor file and individual assets may be stored in the same location or in different locations. Many different forms may be used for the descriptor file; it may contain solely the asset hash for each digital asset (binary sequence), or a wide variety of other information. Assets may be retrieved using the importers described herein, or using other techniques. Assets may be verified only if there is an exact match, or some room for error to allow for minor changes in files may also be acceptable. Accordingly, the present embodiments are to be considered as illustrative and not restrictive, and the invention is not to be limited to the details given herein, but may be modified within the scope and equivalents of the appended claims.

Computer System Embodiment

Figure 8:
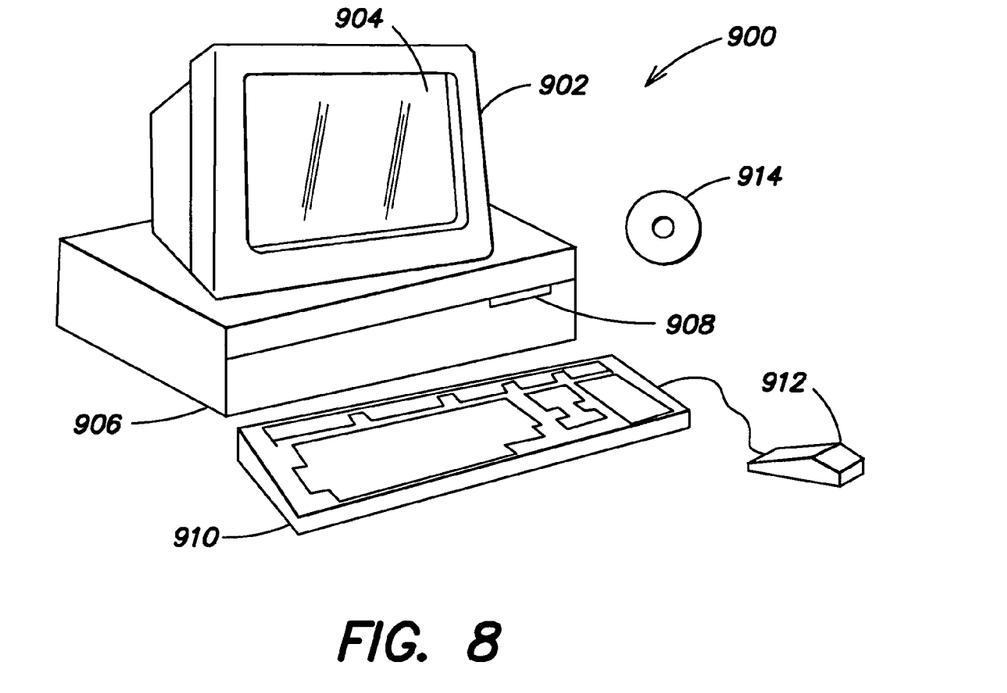
FIGS. 8 and 9 illustrate a computer system 900 suitable for implementing embodiments of the present invention.
Figure 9:
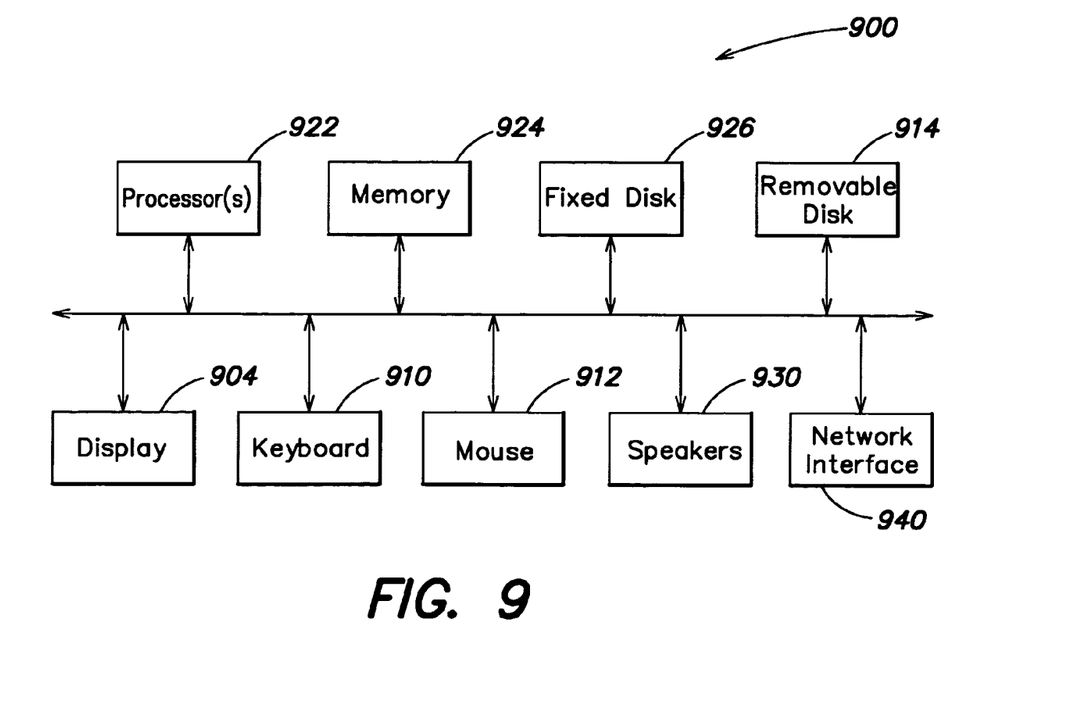

FIGS. 8 and 9 illustrate a computer system 900 suitable for implementing embodiments of the present invention. FIG. 8 shows one possible physical form of the computer system. Of course, the computer system may have many physical forms ranging from an integrated circuit, a printed circuit board and a small handheld device up to a huge super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 9 is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

The invention claimed is:

1. A method for use in a computer system comprising at least a first computer and a second computer, the method comprising an act of:

(A) verifying the integrity of at least one digital asset that comprises content and is identified in the computer system by an original unique identifier that was generated by applying a function to the content of the at least one digital asset, wherein an identifier generated by applying a function to the content of the at least one digital asset is the only type of identifier that can be used in communications between the first and second computers to identify the at least one digital asset, the act of verifying comprising;

re-applying the function to the digital asset to generate a new identifier; and comparing the new identifier to the original unique identifier.

2. The method of claim 1, wherein the at least one digital asset is stored by the first computer and wherein the act (A) is performed in response to a request from the second computer to access the at least one digital asset.

3. The method of claim 1, further comprising an act of receiving the at least one digital asset at the first computer in response to a transmission from the second computer, and wherein the act (A) is performed to ensure that no errors resulted in the transmission of the at least one digital asset from the second computer to the first computer.

4. The method of claim 3, wherein the act (A) is performed in response to receipt of the at least one digital asset at the first computer.

5. The method of claim 3, wherein the second computer transmits the at least one digital asset in response to a request for the at least one digital asset issued from the first computer.

6. The method of claim 1, wherein the at least one digital asset is stored by the first computer and wherein the act (A) is performed by the first computer.

7. The method of claim 1, further comprising an act of:

when it is determined in the act (A) that the new identifier does not match the original unique identifier, automatically reconstructing the at least one digital asset.

8. The method of claim 3, wherein the act (A) is performed by the first computer.

9. The method of claim 1, wherein the first computer is coupled to the second computer by a network, and wherein the method further comprises an act of monitoring the network for a communication including the at least one digital asset.

10. The method of claim 3, wherein the first computer provides content addressable storage.

11. The method of claim 3, wherein the first computer is a silo.

12. The method of claim 3, wherein the first computer is a file server.

13. The method of claim 3, wherein the first computer is a storage system.

14. The method of claim 3, wherein the computer system comprises a plurality of computers in addition to the first and second computers, wherein the plurality of computers are interconnected by at least one network, wherein the computer system stores a plurality of digital assets comprising the at least one digital asset, and wherein each of the plurality of computers manages storage of one or more of the plurality of digital assets.

15. The method of claim 3, wherein the first and second computers are peer computers coupled by at least one network.

16. The method of claim 6, wherein the at least one digital asset is stored on the first computer.

17. The method of claim 6, wherein the at least one digital asset is stored on a storage device managed by the first computer.

18. The method of claim 6, further comprising an act of:
when it is determined in the act (A) that the new identifier does not match the original unique identifier, automatically reconstructing the at least one digital asset.

19. The method of claim 6, wherein the act (A) is performed by the first computer.

20. The method of claim 6, wherein the first computer provides content addressable storage.

21. The method of claim 6, wherein the first computer is a storage system.

22. The method of claim 1, wherein the first computer comprises an importer and wherein the act (A) is performed by the first computer.

23. The method of claim 1, wherein the computer system stores, on at least one computer-readable medium, a plurality of digital assets including the at least one digital asset, wherein the at least one digital asset is a first digital asset comprising data and having associated metadata, and wherein the plurality of digital assets further comprises a second digital asset that comprises at least some of the metadata of the first digital asset.

24. The method of claim 1, wherein the computer system stores, on at least one computer-readable medium, a plurality of digital assets including the at least one digital asset, wherein the at least one digital asset is a first digital asset, wherein the plurality of digital assets further comprises a second digital asset comprising data and having associated metadata, and wherein the first digital asset comprises at least some of the metadata of the second digital asset.

25. At least one computer for use in a computer system, the at least one computer comprising:
at least one processor programmed to verify the integrity of at least one digital asset that comprises content and is identified in the computer system by an original unique identifier that was generated by applying a function to the content of the at least one digital asset, wherein an identifier generated by applying a function to the content of the at least one digital asset is the only type of identifier that can be used in communications between the first and second computers to identify the at least one digital asset, the at least one processor being programmed to verify the integrity of the at least one digital asset by;
re-applying the function to the digital asset to generate a new identifier; and
comparing the new identifier to the original unique identifier.

26. The at least one computer of claim 25, wherein the computer system comprises a first computer and a second computer, wherein the at least one computer comprises the first computer, wherein the at least one digital asset is stored by the first computer, and wherein the at least one processor is programmed to verify the integrity of the at least one digital asset in response to a request from the second computer to access the at least one digital asset.

27. The at least one computer of claim 25, wherein the computer system comprises a first computer and a second computer, wherein the at least one computer comprises the first computer, wherein the at least one digital asset is received at the first computer in response to a transmission from the second computer, and wherein the at least one processor is programmed to verify the integrity of the at least one digital asset to ensure that no errors resulted in the transmission of the at least one digital asset from the second computer to the first computer.

28. The at least one computer of claim 27, wherein the at least one processor is programmed to verify the integrity of the at least one digital asset in response to receipt of the at least one digital asset at the first computer.

29. The at least one computer of claim 27, wherein the second computer transmits the at least one digital asset in response to a request for the at least one digital asset issued from the first computer.

30. The at least one computer of claim 25, wherein the at least one digital asset is stored by the at least one computer.

31. The at least one computer of claim 25, wherein the at least one processor is programmed to, when it is determined that the new identifier does not match the original unique identifier, automatically reconstruct the at least one digital asset.

32. The at least one computer of claim 26, wherein the first computer is coupled to the second computer by a network, and wherein the at least one processor is programmed to monitor the network for a communication including the at least one digital asset.

33. The at least one computer of claim 27, wherein the first computer provides content addressable storage.

34. The at least one computer of claim 27, wherein the first computer is a silo.

35. The at least one computer of claim 27, wherein the first computer is a file server.

36. The at least one computer of claim 27, wherein the first computer is a storage system.

37. The at least one computer of claim 27, wherein the computer system comprises a plurality of computers in addition to the first and second computers, wherein the plurality of computers are interconnected by at least one network, wherein the computer system stores a plurality of digital assets comprising the at least one digital asset, and wherein each of the plurality of computers manages storage of one or more of the plurality of digital assets.

38. The at least one computer of claim 27, wherein the first and second computers are peer computers coupled by at least one network.

39. The at least one computer of claim 30, wherein the at least one digital asset is stored on the at least one computer.

40. The at least one computer of claim 30, wherein the at least one digital asset is stored on a storage device managed by the at least one computer.

41. The at least one computer of claim 30, wherein the at least one processor is programmed to, when it is determined that the new identifier does not match the original unique identifier, automatically reconstruct the at least one digital asset.

42. The at least one computer of claim 30, wherein the first computer comprises the at least one processor.

43. The at least one computer of claim 30, wherein the first computer provides content addressable storage.

44. The at least one computer of claim 30, wherein the first computer is a storage system.

45. The at least one computer of claim 26, wherein the first computer further comprises an importer.

46. The at least one computer of claim 25, wherein the computer system comprises a plurality of digital assets including the at least one digital asset, wherein the at least one digital asset is a first digital asset comprising data and having associated metadata, and wherein the plurality of digital assets further comprises a second digital asset that comprises at least some of the metadata of the first digital asset.

47. The at least one computer of claim 25, wherein the computer system comprises a plurality of digital assets including the at least one digital asset, wherein the at least one digital asset is a first digital asset, wherein the plurality of digital assets further comprises a second digital asset comprising data and having associated metadata, and wherein the first digital asset comprises at least some of the metadata of the second digital asset.

48. A method for use in a computer system comprising at least a first computer and a second computer, the method comprising an act of:
(A) verifying the integrity of at least one digital asset that comprises content and is identified in the computer system by an original unique first identifier that was generated by applying a function to the content of the at least one digital asset, the computer system further storing a unit of data that comprises the first identifier and metadata relating to the at least one digital asset, the unit of data being identified via a second identifier generated based, at least in part, on the content of the unit of data, the act of verifying comprising;
re-applying the function to the at least one digital asset to generate a new first identifier; and
comparing the new first identifier to the original unique first identifier.

49. The method of claim 48, wherein the at least one digital asset is stored by the first computer and wherein the act (A) is performed in response to a request from the second computer to access the at least one digital asset.

50. The method of claim 48, further comprising an act of receiving the at least one digital asset at the first computer in response to a transmission from the second computer, and wherein the act (A) is performed to ensure that no errors resulted in the transmission of the at least one digital asset from the second computer to the first computer.

51. The method of claim 50, wherein the act (A) is performed in response to receipt of the at least one digital asset at the first computer.

52. The method of claim 50, wherein the second computer transmits the at least one digital asset in response to a request for the at least one digital asset issued from the first computer.

53. The method of claim 48, wherein the at least one digital asset is stored by the first computer and wherein the act (A) is performed by the first computer.

54. The method of claim 48, further comprising an act of:
when it is determined in the act (A) that the new first identifier does not match the original unique first identifier, automatically reconstructing the at least one digital asset.

55. The method of claim 50, wherein the act (A) is performed by the first computer.

56. The method of claim 48, wherein the first computer is coupled to the second computer by a network, and wherein the method further comprises an act of monitoring the network for a communication including the at least one digital asset.

57. The method of claim 50, wherein the first computer provides content addressable storage.

58. The method of claim 50, wherein the first computer is a silo.

59. The method of claim 50, wherein the first computer is a file server.

60. The method of claim 50, wherein the first computer is a storage system.

61. The method of claim 50, wherein the computer system comprises a plurality of computers in addition to the first and second computers, wherein the plurality of computers are interconnected by at least one network, wherein the computer system stores a plurality of digital assets comprising the at least one digital asset, and wherein each of the plurality of computers manages storage of one or more of the plurality of digital assets.

62. The method of claim 50, wherein the first and second computers are peer computers coupled by at least one network.

63. The method of claim 53, wherein the at least one digital asset is stored on the first computer.

64. The method of claim 53, wherein the at least one digital asset is stored on a storage device managed by the first computer.

65. The method of claim 53, further comprising an act of:
when it is determined in the act (A) that the new first identifier does not match the original unique first identifier, automatically reconstructing the at least one digital asset.

66. The method of claim 53, wherein the act (A) is performed by the first computer.

67. The method of claim 53, wherein the first computer provides content addressable storage.

68. The method of claim 53, wherein the first computer is a storage system.

69. The method of claim 48, wherein the first computer comprises an importer and wherein the act (A) is performed by the first computer.

* * * * *